Sept. 27, 1927.
J. R. FLEMING
TRUCK FOR MINE CARS
Filed Feb. 9, 1926
1,643,298
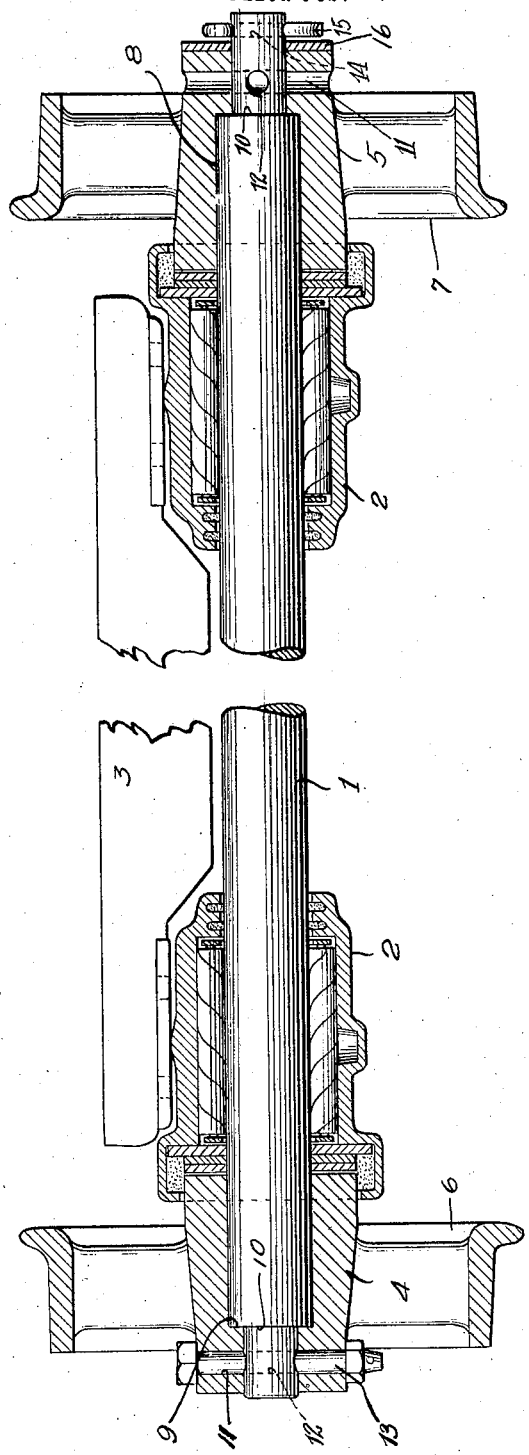
INVENTOR
JAMES R. FLEMING.
BY
Edwin F. Murdoch
ATTORNEY Patented Sept. 27, 1927.

1,643,298

UNITED STATES PATENT OFFICE.

JAMES R. FLEMING, OF SCRANTON, PENNSYLVANIA.

TRUCK FOR MINE CARS.

Application filed February 9, 1926. Serial No. 87,008.

This invention relates to running gear for mine cars or the like, and particularly to the wheels and axles thereof.

It is a practice to use wheels, the hubs of which are adapted to receive the axle in such manner that there will be a shouldered contact between the axle and the hubs to limit the movement of the wheels toward each other. In this construction, the wheels have usually been held loosely on the axle, so that they are free to rotate independently of each other and independently of the axle. Where, however, in the construction in which journal boxes are used which include anti-friction bearings for the axle, it is essential that one of the wheels be rigidly secured to the axle, and it is desirable to secure the other wheel to the axle at times so that it will rotate independently thereon, and at other times so that it will rotate with the axle.

My invention contemplates the provision of a running gear of this type wherein means is provided to secure one of the wheels to the axle rigidly, and to selectively secure the other wheel to the axle either rigidly or rotatably.

It is an object of this invention to so construct the truck that the wheels may be interchangeably used on the opposite ends of the axle and so that, when the truck goes around a curve in the track, the relative movement between the axle and the loose wheel will be of such a limited extent that the necessity for lubricating the surface contact between the hub of the wheel and the axle will be obviated.

In the drawing

The figure is a longitudinal, sectional view through the truck.

The embodiment of the invention disclosed in the drawings includes an axle 1 on which are mounted journal boxes 2 of the anti-friction type, on which journal boxes the car bottom 3 is supported.

The hubs 4 and 5 of the wheels 6 and 7 which are mounted on the ends of the axle 1 are provided with axial openings which extend through the hubs and have shoulders 9 formed therein. These axial openings 8 are adapted to receive the ends of the axle and the axle is provided with shoulders 10 which are adapted to cooperate with the shoulders 9 on the hubs of the wheel to prevent the movement of the wheels toward each other or, in other words, inwardly. Each of the hubs 4 and 5 is provided with an opening 11 which is adapted to align with a complemental opening 12 in the adjacent end of the axle 1. When it is desired to secure both of the wheels rigidly to the axle, this may be done by inserting pins or bolts 13 through the openings 11 in the hubs of both wheels and through the aligned openings 12 in the axle. When, however, it is desired to secure one of the wheels rigidly to the axle and the other wheel loosely so that it will be capable of rotating on the axle independently of the rotation of the axle, I contemplate accomplishing the result in the following manner.

The reduced portion of the axle at one end thereof is of such length that it will extend beyond the end of the hub or, in other words, is of a length greater than the distance between the end of the hub and the shoulder contact 9—10 between the hub and the axle. In this extended portion of the axle I provide an opening 14 which is adapted to receive a locking element such as a cotter pin 15, and is located a sufficient distance from the end of the hub to permit the mounting of a washer 16 between the cotter pin and the end of the hub.

This washer is loosely mounted on the axle so that when it contacts with the cotter pin 15 it will cease its rotative movement due to its frictional engagement with the end of the hub and the axle, and the relative movement will thereafter be between the face of the washer and the end of the hub.

In assembling the elements of the truck it is perfectly obvious that both of the wheels may be secured to the axle by inserting the bolts 13 through the openings in the hubs and the aligned openings in the axle, or that but one of the wheels may be secured in this manner and the other wheel secured to the axle so that it will rotate thereon by passing the cotter pin 15 through the opening at the end of the axle and omitting the pin 13.

When the two tight wheels, that is to say, the two wheels which are rigidly secured to the axle are used, and the truck passes around a curve, there being no differential action, one of the wheels must of course slip on the rail. This of course is incident to the greater travel of the wheel on the outside curve than that on the inside curve. By the construction which I have hereinbefore described, where the one wheel is rigidly secured to the axle and the other secured so that it may rotate with relation thereto, the slippage is prevented and the loose wheel rotates with relation to the axle only to the extent sufficient to take care of the slippage which would be incident to the use of two tight wheels, that is to say, two wheels which are rigidly secured to the axle. The result of this construction is that the undesirable slippage which is incident to the use of two tight wheels is eliminated.

What I claim is:

A device of the class described comprising an axle having a reduced portion at its end providing a shoulder, a wheel mounted on said end and having an elongated hub, the hub of said wheel having a bore of different diameters providing a shoulder for cooperation with the shoulder on the axle, and a fastening member extending through openings in the hub and the reduced portion of the axle.

JAMES R. FLEMING.